United States Patent [19]
Warren et al.

[11] Patent Number: 5,946,344
[45] Date of Patent: Aug. 31, 1999

[54] MULTIPLE-RATE DIRECT SEQUENCE ARCHITECTURE UTILIZING A FIXED CHIPPING RATE AND VARIABLE SPREADING CODE LENGTHS

[75] Inventors: Bruce G. Warren, Poulsbo; Alan F. Jovanovich, Des Moines; John W. Mensonides, Monroe; Duane G. Charron, Marysville, all of Wash.

[73] Assignee: Intermec IP Corp., Woodland Hills, Calif.

[21] Appl. No.: 08/826,777

[22] Filed: Apr. 7, 1997

[51] Int. Cl.⁶ .................................................. H04B 15/00
[52] U.S. Cl. .......................... 375/207; 375/200; 375/208; 375/209; 375/210
[58] Field of Search .................................. 375/200, 207, 375/208, 209, 210, 343

[56] References Cited

U.S. PATENT DOCUMENTS

| | | | |
|---|---|---|---|
| 3,604,911 | 9/1971 | Schmitt | 235/181 |
| 3,689,884 | 9/1972 | Tew, Jr. | 340/146 |
| 4,032,885 | 6/1977 | Roth | 340/146.1 |
| 4,984,247 | 1/1991 | Kaufmann et al. | 375/1 |
| 5,022,047 | 6/1991 | Dixon et al. | 375/1 |
| 5,132,986 | 7/1992 | Endo et al. | 375/1 |
| 5,184,135 | 2/1993 | Paradise | 342/149 |
| 5,293,398 | 3/1994 | Hamao et al. | 375/1 |
| 5,499,265 | 3/1996 | Dixon et al. | 375/200 |
| 5,680,414 | 10/1997 | Durrant et al. | 375/206 |
| 5,748,671 | 5/1998 | Sutterlin et al. | 275/206 |
| 5,784,403 | 7/1998 | Scott | 375/207 |
| 5,790,588 | 8/1998 | Fukawa et al. | 375/200 |

FOREIGN PATENT DOCUMENTS 0 366 086  5/1990  European Pat. Off. .

*Primary Examiner*—Stephen Chin
*Assistant Examiner*—Mohammad Ghayour
*Attorney, Agent, or Firm*—Graham & James LLP

[57] ABSTRACT

A spread spectrum communication system is provided in which a receiver is adapted to despread multi-bit digital signals transmitted with a fixed chipping rate using two or more different spreading code lengths. As a result, a longer spreading code could be utilized to transmit at a lower data rate for conditions in which jamming resistance is more critical, such as over longer distances, and a shorter spreading code could be utilized to transmit at a higher data rate for conditions in which jamming resistance is less critical, such as over shorter distances. The receiver further comprises a digital matched filter adapted to correlate to the two different spreading codes. The digital matched filter comprises a digital delay line having a plurality of successive delay stages that propagate the received digital signal therethrough at a fixed rate corresponding to the chipping rate of the digital signal. A first correlator compares the digital signal to a first spreading code having a length M, and a second correlator compares the digital signal to a second spreading code having a length N, in which N is less than M. A multiplexer is adapted to select an output from one of the two correlators.

26 Claims, 2 Drawing Sheets

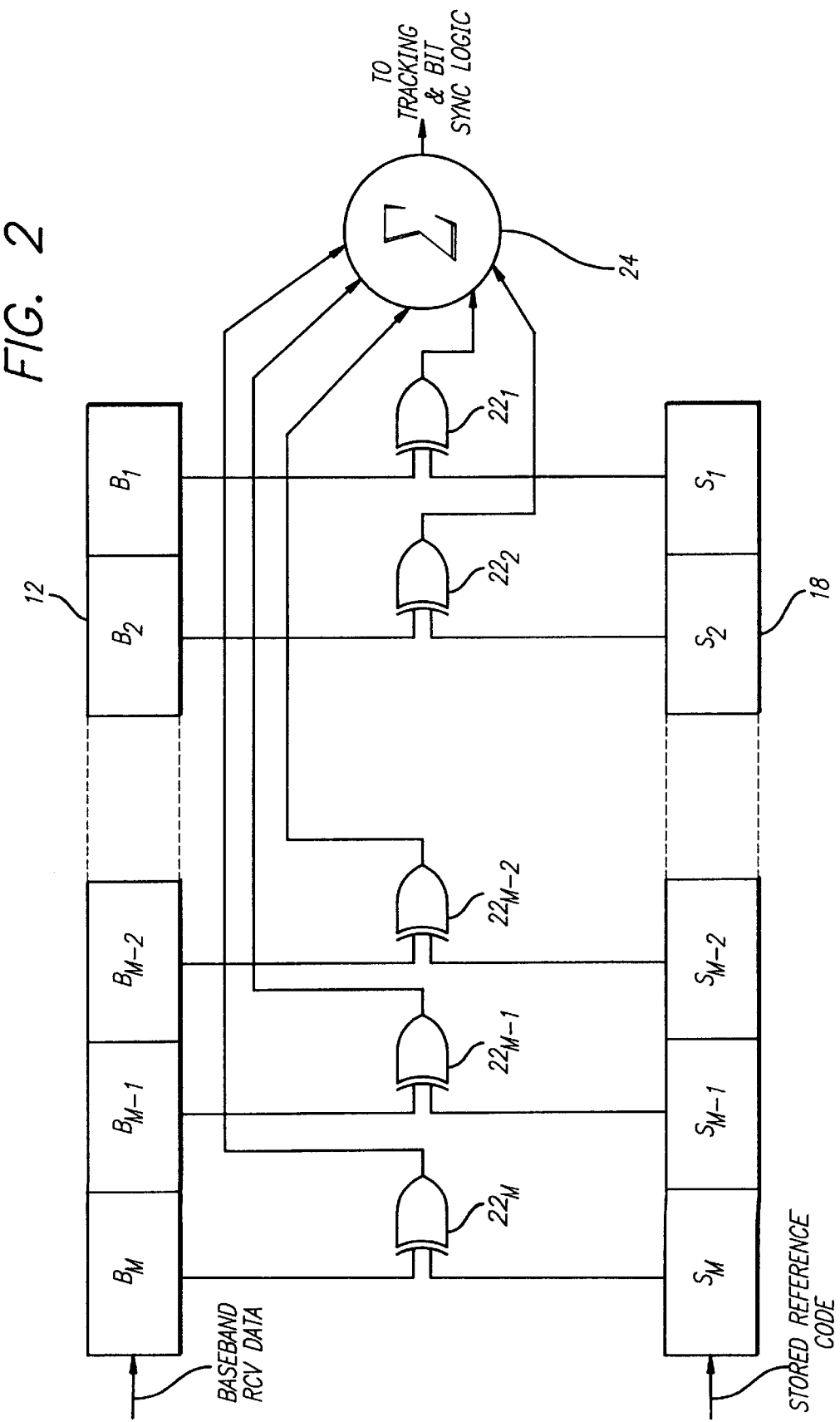

MULTIPLE-RATE DIRECT SEQUENCE ARCHITECTURE UTILIZING A FIXED CHIPPING RATE AND VARIABLE SPREADING CODE LENGTHS

BACKGROUND OF THE INVENTION

1. Field of the Invention

The present invention relates to radio receivers for direct sequence spread spectrum communications, and more particularly, to a radio receiver that can detect plural radio signals transmitted at a fixed chipping rate with different length spreading codes.

2. Description of Related Art

Spread spectrum modulation techniques are increasingly desirable for communications, navigation, radar and other applications. In a spread spectrum system, the transmitted signal is spread over a frequency band that is significantly wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby reducing interference to other radio devices. In view of these significant advantages, spread spectrum communication systems are highly desirable for commercial data transmission.

In one type of spread spectrum communication system, a radio frequency (RF) carrier is modulated by a digital code sequence having a bit rate, or chipping rate, much higher than a clock rate of the information signal. These spread spectrum systems are known as "direct sequence" modulation systems. The RF carrier may be binary or quadrature modulated by one or more data streams such that the data streams have one phase when a code sequence represents a data "one" and a predetermined phase shift (e.g., 180° for binary, and 90° for quadrature) when the code sequence represents a data "zero." These types of modulation are commonly referred to as binary shift key (BPSK) and quadrature shift key (QPSK) modulation, respectively.

It is also known to use a plurality of spread spectrum radio receivers that are coupled together in a wireless local area network (WLAN). A central host processing unit could send information to and receive information from any one of the plurality of remotely disposed receivers. In such a WLAN, the remote receivers may comprise portable units that operate within a defined environment to report information back to the central host processing unit. Each of the remote receivers would communicate with the host processing unit using the same RF carrier frequency and digital code sequence. It should be apparent that such WLAN systems offer increased flexibility over hard-wired systems by enabling operators of the remote receivers substantial freedom of movement through the environment.

The individual radio receivers amplify and filter an RF signal transmitted from the host processing unit to remove the RF carrier and provide a digital information signal that has been modulated by the digital code sequence. The receiver then "de-spreads" the digital signal by use of a digital match filter that is correlated with the digital code sequence to remove the modulation and recover the digital information. Discrete digital bits of the de-spread digital information are then assembled into packets having a pre-defined format that can be processed subsequently by use of conventional data processing logic systems, such as a microprocessor, digital signal processor, and the like.

In a communication system, energy gain can be defined as the signal-to-jamming ratio. The higher the signal-to-jamming ratio, the more immune the receiver is to jamming interference (or background noise) which increases the effective range of the receiver. For BPSK or QPSK communication systems operating without receiver diversity, the process gain is essentially identical to the energy gain. The process gain in spread spectrum processors may be defined as bandwidth (BW) available for communicating an information signal divided by the data rate ($R_b$). In decibels (dB), this ratio is defined as follows:

$$PG_{dB} = 10\ \log_{10}\ (BW/R_b)$$

According to the preceding equation, for a fixed bandwidth, the processing gain increases as the data rate is decreased. By fixing the chipping rate, the bandwidth is also fixed. A fixed bandwidth is desirable since it allows optimization of the transmit and receive RF circuitry. Therefore, a lower data rate will provide more jamming or noise immunity than a higher data rate, and the processing gain of the receiver is increased approximately 3 dB each time the data rate is halved. Even though the increased jamming immunity is desirable in such WLAN systems, the associated reduction in data rate tends to degrade the rate of data throughput within the overall system. As a result, communication system designers must balance the two desirable attributes of jamming immunity and data throughput in order to provide an acceptable and practical system solution.

Thus, it would be desirable to provide a direct sequence spread spectrum communication system having a fixed chipping rate that achieves the jamming immunity of a low data rate system while also having the data throughput of a high data rate system.

SUMMARY OF THE INVENTION

A spread spectrum communication system is provided in which a receiver is adapted to despread multi-bit digital signals transmitted with a fixed chipping rate using two or more different spreading code lengths. As a result, a longer spreading code could be utilized to transmit at a lower data rate for conditions in which jamming resistance is more critical, such as over longer distances, and a shorter spreading code could be utilized to transmit at a higher data rate for conditions in which jamming resistance is less critical, such as over shorter distances.

In an embodiment of the present invention, the receiver comprises a digital matched filter adapted to correlate to two different spreading codes. The digital matched filter comprises a digital delay line having a plurality of successive stages that propagate the received digital signal therethrough at a fixed rate greater than or equal to two times the chipping rate of the digital signal. A first correlator compares the digital signal to a first spreading code having a length M, and a second correlator compares the digital signal to a second spreading code having a length N, in which N is less than M. A multiplexer is adapted to select an output from one of the two correlators.

More particularly, the first correlator comprises M exclusive-OR logic gates each having a first input coupled to a corresponding one of the stages of the digital delay line and a second input coupled to a corresponding bit of the first spreading code. A summing device is coupled to each output of the M logic gates to provide a sum of the outputs indicating a correlation between the first spreading code and the digital signal. A data signal and a clock signal are derived from the sum of outputs from the M logic gates, and a preamble of a message communicated by the communication system is detected to enable the multiplexer to select the output from the first correlator. Similarly, the second correlator comprises N exclusive-OR logic gates each having a first input coupled to a corresponding one of the stages of the digital delay line and a second input coupled to a corresponding bit of the second spreading code. A summing device is coupled to each output of the N logic gates to provide a sum of the outputs indicating a correlation between the second spreading code and the digital signal. A data signal and a clock signal are derived from the sum of outputs from the N logic gates, and a preamble of a message communicated by the communication system is detected to enable the multiplexer to select the output from the second correlator.

A more complete understanding of the a multiple-rate direct sequence architecture utilizing a fixed chipping rate and variable spreading code lengths will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a block diagram shown an example of a digital correlator for use in the digital matched filter of FIG. 1.

DETAILED DESCRIPTION OF THE PREFERRED EMBODIMENT

Figure 1:
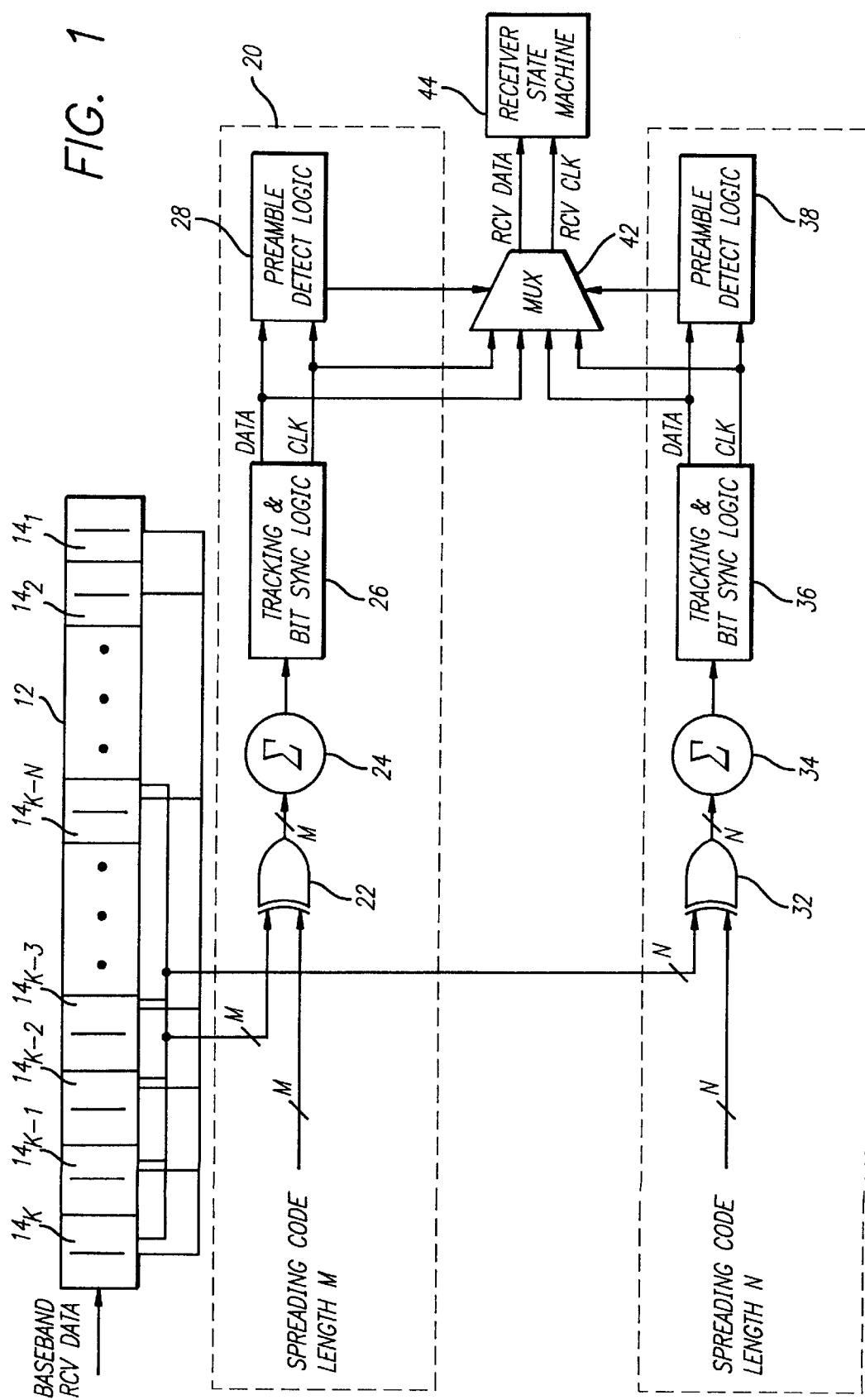
FIG. 1 is a block diagram illustrating a digital matched filter for a direct sequence spread spectrum communication system according to an embodiment of the present invention.

The present invention satisfies the need for a direct sequence spread spectrum communication system having a fixed chipping rate to provide both the jamming immunity of a low data rate system and the data throughput of a high data rate system. In the detailed description that follows, it should be appreciated that like element numerals are used to describe like elements depicted in one or more of the figures.

Referring first FIG. 1, an embodiment of a digital matched filter for a receiver of a direct sequence spread spectrum communication system is shown. As generally known in the art, a receiver of a direct sequence spread spectrum communication system receives an RF signal, and downconverts the RF signal to a baseband signal by multiplying the received signal with a carrier frequency generated by a local oscillator. The downconverted signal is then converted from analog to digital by an analog-to-digital converter, and may also be filtered by a low pass filter to remove any aliasing noise. Thereafter, the received signal is in the form of a multi-bit digital signal having a chipping rate of the spreading code originally used to modulate the digital information of the signal. The received signal may additionally include two signal components, called the I channel and the Q channel, having phases that are 90° from each other. The separate I and Q components would be downconverted and filtered in the same manner described above to yield multi-bit digital signals. It should be appreciated that these well known aspects of a receiver would be included in an operational system. To simplify the present detailed description, further description of these well known aspects is omitted.

The digital matched filter of the present invention includes a digital delay line 12, a first correlator 20, and a second correlator 30. The digital delay line 12 may comprise a conventional shift register having a plurality of distinct delay stages $14_K$–$14_1$. Each one of the delay stages $14_K$–$14_1$ provides a delay of less than one half the period of the expected spreading code clock, or the chipping rate, in order to satisfy the Nyquist sampling theorem. The delay line 12 receives a baseband signal that is biphase-modulated by a code sequence, or spreading code, so that phase reversals occur at each one/zero transition in the code. The signal propagates down the delay line 12 through a series of successive shifts at a rate corresponding to the chipping rate.

At a rate greater than twice the chipping rate, the data values contained in the delay stages $14_K$–$14_1$ are sampled through tapped connections with each of the first and second correlators 20, 30. The first correlator 20 will determine whether the signal 2.,c contained in the delay line 12 correlates to a first spreading code having length M, and the second correlator 30 will determine whether the signal contained in the delay line 12 correlates to a second spreading code having length N, wherein M is greater than N. As illustrated in FIG. 1, the delay line 12 has K delay stages $14_K$–$14_1$, and the first spreading code length M is equal to K so that each delay stage is sampled by the first correlator 20. The second spreading code length N is less than K, so that only delay stages $14_K$–$14_N$ are sampled by the second correlator 30. It should be appreciated that K may be greater than M to accommodate different spreading code lengths, but that K cannot be less than M.

The first and second correlators 20, 30 are substantially identical in construction, and include exclusive OR logic gates 22, 32, summing devices 24, 34, tracking and bit synchronization logic units 26, 36, and preamble detect logic units 28, 38. The exclusive OR logic gates 22, 32 compare the signals contained in the respective delay stages $14_K$–$14_1$ to the corresponding chips of the first and second spreading codes M, N, respectively. The summing devices 24, 34 sum the outputs of the exclusive OR logic gates 22, 34 to provide a sum value that is proportional to the degree of correlation between the received signal and the first and second spreading codes M, N, respectively.

Referring briefly to FIG. 2, a portion of the correlator 20 is illustrated in greater detail. The baseband received data chips $B_M$–$B_1$ are sampled from the respective delay stages $14_K$–$14_1$, and are applied to respective first terminals of the exclusive OR logic devices $22_M$–$22_1$. The chips $S_M$–$S_1$ of the first spreading code M are preloaded from memory into a register 18, and are applied to respective second terminals of the exclusive OR logic devices $22_M$–$22_1$. Outputs of each of the exclusive OR logic devices $22_M$–$22_1$ are provided to the summing device 24, which provides the sum value described above. It should be appreciated that the correlator 30 would be similar in construction to the correlator 20, but would require N exclusive OR logic devices to accommodate the second spreading code N.

Returning to FIG. 1, the tracking and bit synchronization logic units 26, 36 monitor the sum values provided by the summing devices 24, 34 to determine whether a correlation is established between one of the spreading codes M, N and the received signal. Upon detection of such a correlation, the tracking and bit synchronization logic units 26, 36 synchronize the timing of the digital matched filter to the received signal by generating a data output containing despread digital information recovered from the received signal and a regulated clock output to which the data output is synchronized. After synchronization with the received signal has been achieved, the tracking and bit synchronization logic units 26, 36 may adjust the propagation rate of the delay line 12 to match the incoming code chipping rate as precisely as possible. Such tracking and bit synchronization systems are known in the art.

The preamble detect logic units 28, 38 are used to detect the start of an information message transmitted by the communication system. Information messages are typically transmitted in the form of packets having a predefined format and length. The packets include an initial code sequence, known as a preamble, that signifies the beginning of transmission of a packet. The preamble detect logic units 28, 38 monitor the data output and clock output from the tracking and bit synchronization logic units 26, 36, respectively, to detect such a preamble. Such preamble detect systems are known in the art.

Upon detection of a preamble, the preamble detect logic units 28, 38 provide an enable signal to a multiplexer 42. The multiplexer 42 is coupled to the tracking and bit synchronization logic units 26, 36, and receive the data output and clock output from both the first and second correlators 20, 30. The enable signal from one of the preamble detect logic units 28, 38 causes the multiplexer to permit the data output and clock output from that particular correlator 20, 30 to pass to the receiver state machine 44, which processes the information being transmitted.

In operation of the present invention, a transmitter of a WLAN may be used to transmit information over one of two logical channels using a fixed chipping rate and different length spreading codes M or N. As the receiver is brought into relatively close proximity to the transmitter, jamming immunity becomes a less important concern, and the shorter spreading code N may be used to transmit at a higher data rate with a penalty of range. Conversely, as the receiver is carried more distant from the transmitter, higher processing gain and greater jamming immunity can be obtained by transmitting at the longer spreading code M at a penalty of decreased data rate. Thus, the use of dual matched filters allows the simultaneous use of multiple data rates. It should be appreciated that an even greater number of channels can be utilized by adding other correlators in parallel to the two correlators described above.

Having thus described a preferred embodiment of a multiplerate direct sequence architecture utilizing a fixed chipping rate and variable spreading code lengths, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A digital matched filter for a spread spectrum communication system comprises:
    a digital delay line having a plurality of successive delay stages adapted to receive a digital signal and propagate said digital signal therethrough at a fixed rate;
    a first correlator coupled to said digital delay line to correlate said digital signal to a first spreading code having a length M;
    a second correlator coupled to said digital delay line to correlate said digital signal to a second spreading code having a length N, wherein N is less than M; and
    a multiplexer coupled to each of said first and second correlators, said multiplexer selecting an output from one of said first and second correlators that correlates to a respective one of said first and second spreading codes, whereby said first spreading code is used to transmit at a lower data rate with higher jamming resistance, and said second spreading code is used to transmit at a higher data rate with lower jamming resistance.

2. The digital matched filter of claim 1, wherein said first correlator further comprises:
    M logic gates each having a first input coupled to a corresponding one of said stages of said digital delay line and a second input coupled to a corresponding bit of said first spreading code; and
    a summing device coupled to respective outputs of each of said M logic gates to provide a sum of said outputs indicating a correlation between said first spreading code and said digital signal.

3. A digital matched filter for a spread spectrum communication system comprising:
    a digital delay line having a plurality of successive delay stages adapted to receive a digital signal and propagate said digital signal therethrough at a fixed rate;
    a first correlator coupled to said digital delay line to correlate said digital signal to a first spreading code having a length M;
    a second correlator coupled to said digital delay line to correlate said digital signal to a second spreading code having a length N, wherein N is less than M; and
    a multiplexer coupled to each of said first and second correlators, said multiplexer selecting an output from one of said first and second correlators that correlates to a respective one of said first and second spreading codes, wherein said first correlator further comprises:
        M logic gates each having a first input coupled to a corresponding one of said stages of said digital delay line and a second input coupled to a corresponding bit of said first spreading code; and
        a summing device coupled to respective outputs of each of said M logic gates to provide a sum signal therefrom indicating a correlation between said first spreading code and said digital signal, wherein said first correlator further comprises means for deriving a data signal and a clock signal from said sum signal.

4. A digital matched filter for a spread spectrum communication system comprising:
    a digital delay line having a plurality of successive delay stages adapted to receive a digital signal and propagate said digital signal therethrough at a fixed rate;
    a first correlator coupled to said digital delay line to correlate said digital signal to a first spreading code having a length M;
    a second correlator coupled to said digital delay line to correlate said digital signal to a second spreading code having a length N, wherein N is less than M; and
    a multiplexer coupled to each of said first and second correlators, said multiplexer selecting an output from one of said first and second correlators that correlates to a respective one of said first and second spreading codes, wherein said first correlator further comprises:
        M logic gates each having a first input coupled to a corresponding one of said stages of said digital delay line and a second input coupled to a corresponding bit of said first spreading code; and
        a summing device coupled to respective outputs of each of said M logic gates to provide a sum signal therefrom indicating a correlation between said first spreading code and said digital signal, wherein said first correlator further comprises means for detecting a preamble of a message communicated by said communication system, said detecting means enabling said multiplexer to select said output from said first correlator.

5. The digital matched filter of claim 2, wherein said logic gates further comprise exclusive-OR logic gates.

6. The digital matched filter of claim 1, wherein said second correlator further comprises:

N logic gates each having a first input coupled to a corresponding one of said stages of said digital delay line and a second input coupled to a corresponding bit of said second spreading code; and a summing device coupled to respective outputs of each of said N logic gates to provide a sum of said outputs indicating a correlation between second spreading code and said digital signal.

7. A digital matched filter for a spread spectrum communication system comprising:

a digital delay line having a plurality of successive delay stages adapted to receive a digital signal and propagate said digital signal therethrough at a fixed rate;

a first correlator coupled to said digital delay line to correlate said digital signal to a first spreading code having a length M;

a second correlator coupled to said digital delay line to correlate said digital signal to a second spreading code having a length N, wherein N is less than M; and a multiplexer coupled to each of said first and second correlators, said multiplexer selecting an output from one of said first and second correlators that correlates to a respective one of said first and second spreading codes, wherein said second correlator further comprises:

N logic gates each having a first input coupled to a corresponding one of said stages of said digital delay line and a second input coupled to a corresponding bit of said second spreading code; and a summing device coupled to respective outputs of each of said N logic gates to provide a sum signal therefrom indicating a correlation between said second spreading code and said digital signal, wherein said second correlator further comprises means for deriving a data signal and a clock signal from said sum signal.

8. A digital matched filter for a spread spectrum communication system comprising:

a digital delay line having a plurality of successive delay stages adapted to receive a digital signal and propagate said digital signal therethrough at a fixed rate;

a first correlator coupled to said digital delay line to correlate said digital signal to a first spreading code having a length M;

a second correlator coupled to said digital delay line to correlate said digital signal to a second spreading code having a length N, wherein N is less than M; and a multiplexer coupled to each of said first and second correlators, said multiplexer selecting an output from one of said first and second correlators that correlates to a respective one of said first and second spreading codes, wherein said second correlator further comprises:

N logic gates each having a first input coupled to a corresponding one of said stages of said digital delay line and a second input coupled to a corresponding bit of said second spreading code; and a summing device coupled to respective outputs of each of said N logic gates to provide a sum signal therefrom indicating a correlation between said second spreading code and said digital signal, wherein said second correlator further comprises means for detecting a preamble of a message communicated by said communication system, said detecting means enabling said multiplexer to select said output from said second correlator.

9. In a spread spectrum communication system including a receiver adapted to receive a multi-bit digital signal, said receiver further comprising:

a digital delay line having a plurality of successive delay stages that propagate said multi-bit digital signal therethrough at a fixed rate;

first means for correlating said multi-bit digital signal to a first spreading code having a length M;

second means for correlating said multi-bit digital signal to a second spreading code having a length N, wherein N is less than M; and a multiplexer adapted to select an output from one of said first and second correlating means, whereby said first spreading code is used to transmit at a lower data rate with higher jamming resistance, and said second spreading code is used to transmit at a higher data rate with lower jamming resistance.

10. The receiver of claim 9, wherein said first correlating means further comprises:

M exclusive-OR logic gates each having a first input coupled to a corresponding one of said delay stages of said digital delay line and a second input coupled to a corresponding bit of said first spreading code; and a summing device coupled to each output of said M logic gates, said summing device providing a sum of said outputs indicating a correlation between said first spreading code and said digital signal.

11. In a spread spectrum communication system including a receiver adapted to receive a multi-bit digital signal, said receiver further comprising:

a digital delay line having a plurality of successive delay stages that propagate said multi-bit digital signal therethrough at a fixed rate;

first means for correlating said multi-bit digital signal to a first spreading code having a length M;

second means for correlating said multi-bit digital signal to a second spreading code having a length N, wherein N is less than M; and a multiplexer adapted to select an output from one of said first and second correlating means, wherein said first correlating means further comprises:

M exclusive-OR logic gates each having a first input coupled to a corresponding one of said delay stages of said digital delay line and a second input coupled to a corresponding bit of said first spreading code; and a summing device coupled to each output of said M logic gates, said summing device providing a sum signal therefrom indicating a correlation between said first spreading code and said digital signal, wherein said first correlating means further comprises means for deriving a data signal and a clock signal from said sum signal.

12. In a spread spectrum communication system including a receiver adapted to receive a multi-bit digital signal, said receiver further comprising:

a digital delay line having a plurality of successive delay stages that propagate said multi-bit digital signal therethrough at a fixed rate;

first means for correlating said multi-bit digital signal to a first spreading code having a length M;

second means for correlating said multi-bit digital signal to a second spreading code having a length N, wherein N is less than M; and a multiplexer adapted to select an output from one of said first and second correlating means, wherein said first correlating means further comprises:

M exclusive-OR logic gates each having a first input coupled to a corresponding one of said delay stages of said digital delay line and a second input coupled to a corresponding bit of said first spreading code; and a summing device coupled to each output of said M logic gates, said summing device providing a sum signal therefrom indicating a correlation between said first spreading code and said digital signal, wherein said first correlating means further comprises means for detecting a preamble of a message communicated by said communication system, said detecting means enabling said multiplexer to select said output from said first correlator.

13. The receiver of claim 9, wherein said second correlating means further comprises:

N exclusive-OR logic gates each having a first input coupled to a corresponding one of said delay line and a said digital delay line and a second input coupled to a corresponding bit of said second spreading code; and a summing device coupled to each output of said N logic gates, said summing device providing a sum of said outputs indicating a correlation between said second spreading code and said digital signal.

14. In a spread spectrum communication system including a receiver adapted to receive a multi-bit digital signal, said receiver further comprising:

a digital delay line having a plurality of successive delay stages that propagate said multi-bit digital signal therethrough at a fixed rate;

first means for correlating said multi-bit digital signal to a first spreading code having a length M;

second means for correlating said multi-bit digital signal to a second spreading code having a length N, wherein N is less than M; and a multiplexer adapted to select an output from one of said first and second correlating means, wherein said first correlating means further comprises:

M exclusive-OR logic gates each having a first input coupled to a corresponding one of said delay stages of said digital delay line and a second input coupled to a corresponding bit of said first spreading code; and a summing device coupled to each output of said M logic gates, said summing device providing a sum signal therefrom indicating a correlation between said first spreading code and said digital signal, wherein said second correlating means further comprises means for deriving a data signal and a clock signal from said sum signal.

15. In a spread spectrum communication system including a receiver adapted to receive a multi-bit digital signal, said receiver further comprising:

a digital delay line having a plurality of successive delay stages that propagate said multi-bit digital signal therethrough at a fixed rate;

first means for correlating said multi-bit digital signal to a first spreading code having a length M;

second means for correlating said multi-bit digital signal to a second spreading code having a length N, wherein N is less than M; and a multiplexer adapted to select an output from one of said first and second correlating means, wherein said first correlating means further comprises:

M exclusive-OR logic gates each having a first input coupled to a corresponding one of said delay stages of said digital delay line and a second input coupled to a corresponding bit of said first spreading code; and a summing device coupled to each output of said M logic gates, said summing device providing a sum signal therefrom indicating a correlation between said first spreading code and said digital signal, wherein said second correlating means further comprises means for detecting a preamble of a message communicated by said communication system, said detecting means enabling said multiplexer to select said output from said second correlator.

16. A digital matched filter for a spread spectrum communication system comprises:

a digital delay line having a plurality of successive delay stages adapted to receive a digital signal and propagate said digital signal therethrough at a fixed rate;

a plurality of correlators coupled to said digital delay line and adapted to correlate said digital signal to a plurality of different length spreading codes;

a multiplexer coupled to each of said plurality of correlators, said multiplexer selecting an output from one of said plurality of correlators that correlates to a respective one of said plurality of spreading codes, whereby said spreading codes are selected for transmitting at a data rate based on a desired level of data throughput and jamming resistance.

17. The digital matched filter of claim 16, wherein each one of said plurality of correlators further comprises:

a plurality of logic gates each having a first input coupled to a corresponding one of said stages of said digital delay line and a second input coupled to a corresponding bit of a respective one of said plurality of spreading codes; and a summing device coupled to respective outputs of each of said plurality of logic gates to provide a sum of said outputs indicating a correlation between said respective one of said spreading codes and said digital signal.

18. A digital matched filter for a spread spectrum communication system comprising:

a digital delay line having a plurality of successive delay stages adapted to receive a digital signal and propagate said digital signal therethrough at a fixed rate;

a plurality of correlators coupled to said digital delay line and adapted to correlate said digital signal to a plurality of different length spreading codes;

a multiplexer coupled to each of said plurality of correlators, said multiplexer selecting an output from one of said plurality of correlators that correlates to a respective one of said plurality of spreading codes, wherein each one of said plurality of correlators further comprises:

a plurality of logic gates each having a first input coupled to a corresponding one of said stages of said digital delay line and a second input coupled to a corresponding bit of a respective one of said plurality of spreading codes; and a summing device coupled to respective outputs of each of said plurality of logic gates to provide a sum signal therefrom indicating a correlation between said respective one of said spreading codes and said digital signal, wherein said each one of said plurality of correlators further comprises means for deriving a data signal and a clock signal from said sum signal.

19. A digital matched filter for a spread spectrum communication system comprising:

a digital delay line having a plurality of successive delay stages adapted to receive a digital signal and propagate said digital signal therethrough at a fixed rated;

a plurality of correlators coupled to said digital delay line and adapted to correlate said digital signal to a plurality of different length spreading codes;

a multiplexer coupled to each of said plurality of correlators, said multiplexer selecting an output from one of said plurality of correlators that correlates to a respective one of said plurality of spreading codes, wherein each one of said plurality of correlators further comprises:

a plurality of logic gates each having a first input coupled to a corresponding one of said stages of said digital delay line and a second input coupled to a corresponding bit of a respective one of said plurality of spreading codes; and a summing device coupled to respective outputs of each of said plurality of logic gates to provide a sum signal therefrom indicating a correlation between said respective one of said spreading codes and said digital signal, wherein said each one of said plurality of correlators further comprises means for detecting a preamble of a message communicated by said communication system, said detecting means enabling said multiplexer to select said output from said one of said plurality of correlators.

20. The digital matched filter of claim 17, wherein each one of said plurality of logic gates further comprises exclusive-OR logic gates.

21. The digital matched filter of claim 16, wherein said plurality of correlators further comprises at least two correlators, wherein a first one of said at least two correlators is adapted to correlate said digital signal to a first one of said plurality of spreading codes having a length M, and a second one of said at least two correlators is adapted to correlate said digital signal to a second one of said plurality of spreading codes having a length N.

22. In a spread spectrum communication system including a receiver adapted to receive a digital signal at a fixed chipping rate, a method for despreading the digital signal comprises:

propagating the digital signal at the chipping rate through a digital delay line having a plurality of successive delay stages;

correlating said digital signal in said digital delay line to a first spreading code having a length M and to a second spreading code having a length N, wherein N is less than M; and selecting an output signal based on a correlation with one of said first and second spreading codes, whereby said first spreading code is used to transmit at a lower data rate with higher jamming resistance, and said second spreading code is used to transmit at a higher data rate with lower jamming resistance.

23. The method of claim 22, wherein said correlating step further comprises:

comparing each respective data chip from a corresponding one of said delay stages of said digital delay line to corresponding chips of said first and second spreading codes; and providing a sum value of each said comparison indicating a degree of correlation between said first spreading code and said digital signal and between said second spreading code and said digital signal.

24. In a spread spectrum communication system including a receiver adapted to receive a digital signal at a fixed chipping rate, a method for despreading the digital signal comprises:

propagating the digital signal at the chipping rate through a digital delay line having a plurality of successive delay stages;

correlating said digital signal in said digital delay line to a first spreading code having a length M and to a second spreading code having a length N, wherein N is less than M; and selecting an output signal based on a correlation with one of said first and second spreading codes, wherein said correlating step further comprises:

comparing each respective data chip from a corresponding one of said delay stages of said digital delay line to corresponding chips of said first and second spreading codes;

providing a sum value of each said comparison indicating a degree of correlation between said first spreading code and said digital signal and between said second spreading code and said digital signal; and deriving a respective data signal and clock signal from each said sum value.

25. The method of claim 23, further comprising detecting a preamble of a message communicated by said communication system.

26. The method of claim 22, wherein said correlating step is performed at a rate that is at least double said chipping rate.

* * * * *